United States Patent
Christison

(10) Patent No.: US 8,744,081 B2
(45) Date of Patent: Jun. 3, 2014

(54) SYSTEM AND METHOD FOR IMPLEMENTING CONTENT PROTECTION IN A WIRELESS DIGITAL SYSTEM

(75) Inventor: Gregory L. Christison, Fairview, TX (US)

(73) Assignee: QUALCOMM Incorporated, San Diego, CA (US)

(*) Notice: Subject to any disclaimer, the term of this patent is extended or adjusted under 35 U.S.C. 154(b) by 923 days.

(21) Appl. No.: 12/046,548

(22) Filed: Mar. 12, 2008

(65) Prior Publication Data

US 2008/0232588 A1 Sep. 25, 2008

Related U.S. Application Data

(60) Provisional application No. 60/896,405, filed on Mar. 22, 2007.

(51) Int. Cl.
*H04L 29/06* (2006.01)

(52) U.S. Cl.
USPC .......... 380/270; 380/255; 713/160; 340/5.61; 340/5.64; 455/3.01; 455/39

(58) Field of Classification Search
None
See application file for complete search history.

(56) References Cited

U.S. PATENT DOCUMENTS

| | | | | |
|---|---|---|---|---|
| 5,592,555 A * | 1/1997 | Stewart | ......................... | 380/247 |
| 5,721,778 A | 2/1998 | Kubota et al. | | |
| 6,148,405 A * | 11/2000 | Liao et al. | ......................... | 726/2 |
| 6,249,867 B1 * | 6/2001 | Patel | ............................. | 713/167 |
| 6,985,591 B2 * | 1/2006 | Graunke | ....................... | 380/277 |
| 7,039,392 B2 * | 5/2006 | McCorkle et al. | ............ | 455/411 |
| 7,302,060 B2 * | 11/2007 | Paddon et al. | ................ | 380/270 |
| 7,336,784 B2 * | 2/2008 | Zuili | ............................. | 380/200 |

(Continued)

FOREIGN PATENT DOCUMENTS

| | | |
|---|---|---|
| JP | 8181689 A | 7/1996 |
| JP | 2005033572 A | 2/2005 |

(Continued)

OTHER PUBLICATIONS

Russell, Steve F. Wireless Network Security for Users. Proceedings, International Conference on Information Technology: Coding and Computing, 2001. Pub. Date: 2001. Relevant pp. 172-177. Found on the World Wide Web at: http://ieeexplore.ieee.org/stamp/stamp.jsp?tp=&arnumber=918786.*

(Continued)

*Primary Examiner* — Cordelia Zecher
*Assistant Examiner* — Jeremiah Avery
(74) *Attorney, Agent, or Firm* — Nicholas J. Pauley; Peter Michael Kamarchik; Joseph Agusta

(57) ABSTRACT

A system includes a line-based receiver for receiving protected content from a source and a line-based transmitter for providing the protected content to a destination. The protected content is secure, such as by using a High-bandwidth Digital Content Protection (HDCP) mechanism. Between the line-based transmitter and receiver is a wireless transmitter and a wireless receiver. The wireless transmitter establishes an encrypted wireless link with the wireless receiver according to a second encryption mechanism. The wireless transmitter is further configured for receiving the protected content from the line-based receiver, encrypting the protected content according to the second encryption mechanism, and wirelessly transmitting the encrypted protected content. The wireless receiver is further configured for receiving the wirelessly transmitted protected content from the wireless transmitter and decrypting the protected content according to the second encryption mechanism.

22 Claims, 3 Drawing Sheets

(56) References Cited

U.S. PATENT DOCUMENTS

| | | | |
|---|---|---|---|
| 7,373,508 B1* | 5/2008 | Meier et al. | 713/168 |
| 7,382,882 B1* | 6/2008 | Immonen | 380/270 |
| 7,555,128 B2* | 6/2009 | Ko et al. | 380/270 |
| 7,765,599 B2* | 7/2010 | Casas et al. | 726/26 |
| 2004/0198430 A1* | 10/2004 | Moriyama et al. | 455/556.1 |
| 2004/0223614 A1* | 11/2004 | Seaman | 380/239 |
| 2005/0135611 A1* | 6/2005 | Hardacker | 380/33 |
| 2006/0053472 A1 | 3/2006 | Goto et al. | |
| 2006/0126845 A1* | 6/2006 | Zheng | 380/270 |
| 2006/0209884 A1* | 9/2006 | MacMullan et al. | 370/465 |
| 2006/0217063 A1* | 9/2006 | Parthasarathy | 455/39 |

FOREIGN PATENT DOCUMENTS

| | | | |
|---|---|---|---|
| JP | 2006128963 A | 5/2006 | |
| JP | 2006135728 A | 5/2006 | |
| JP | 2006154466 A | 6/2006 | |
| JP | 2007027807 A | 2/2007 | |
| JP | 2007524288 A | 8/2007 | |
| JP | 2008519548 A | 6/2008 | |
| JP | 2008519549 A | 6/2008 | |
| JP | 2008533913 A | 8/2008 | |
| JP | 2009505507 A | 2/2009 | |
| JP | 2009506715 A | 2/2009 | |
| WO | WO2005067458 A2 | 7/2005 | |
| WO | 2006052339 A2 | 5/2006 | |
| WO | 2006052340 A2 | 5/2006 | |
| WO | WO2006101801 A2 | 9/2006 | |
| WO | 2007021891 A1 | 2/2007 | |
| WO | 2007027285 A2 | 3/2007 | |
| WO | WO2007037379 A1 | 4/2007 | |

OTHER PUBLICATIONS

Jian, Ying; Chen, Shigang; Zhang, Zhan; Zhang, Liang. Protecting Receiver-Location Privacy in Wireless Sensor Networks. INFOCOM 2007. Pub. Date: 2007. Relevant pp. 1955-1963. Found on the World Wide Web at: http://ieeexplore.ieee.org/stamp/stamp.jsp?tp=&arnumber=4215809.*

Microsoft Windows Output Content Protection and Windows Longhorn, WinHEC 2005 Version, Apr. 27, 2005.

Digital Content Protection LLC, High-bandwidth Digital Content Protection System, Revision 1.1, Jun. 9, 2003.

PCT U.S. International Searching Authority, Notification of Transmittal of the International Search Report and the Written Opinion of the International Searching Authority, or the Declaration, Aug. 8, 2008, International Application No. PCT/US08/56889, Alexandria, VA.

* cited by examiner

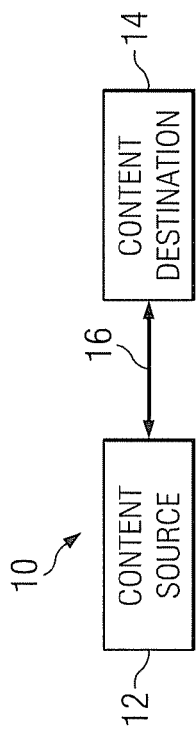
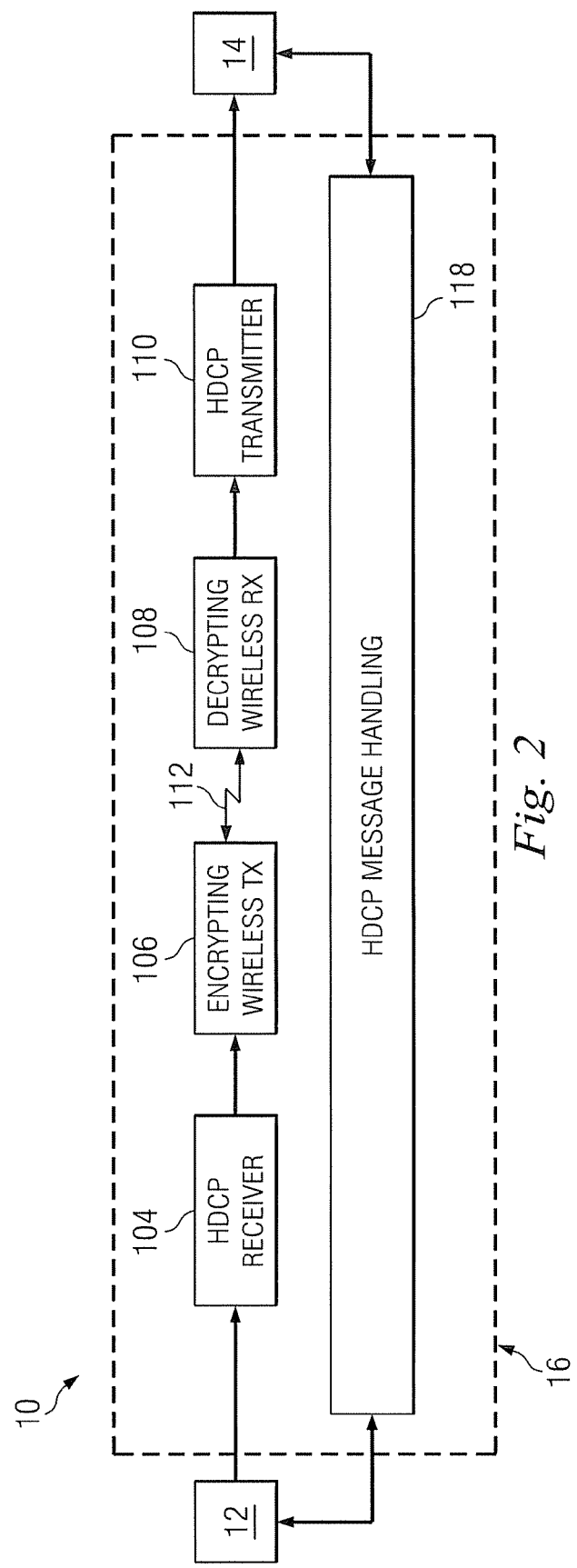

SYSTEM AND METHOD FOR IMPLEMENTING CONTENT PROTECTION IN A WIRELESS DIGITAL SYSTEM

CROSS REFERENCE

The present application claims the benefit of U.S. Provisional Patent Application Ser. No. 60/896,405, which is herein incorporated by reference in its entirety.

BACKGROUND

It is frequently desirable to provide a secure content delivery mechanism for transferring protectable subject matter from one node to another. One example of such a mechanism is the provision of digital video and/or audio over a Digital Video Interface (DVI) or High-Definition Multimedia Interface (HDMI). DVI and HDMI often use a mechanism called High-bandwidth Digital Content Protection (HDCP) to prevent the interception of the audio/video between the content source and destination. By using HDCP, data, such as copyright protectable movies and music, can be securely transmitted with a reduced likelihood of theft.

HDCP is required, by standard, to be delivered over a physical link, such as an HDMI cable. Furthermore, connections between two such links require the use of a repeater that provides endpoint data encryption termination to both links, and fulfills any encryption and/or key requirements for each individual link. HDCP repeaters are generally described in the document "High-bandwidth Digital Content Protection System," Revision 1.1, Jun. 9, 2003, (hereinafter "HDCP System Standard") which is hereby incorporated by reference into the present application in its entirety.

HDCP compliant devices are required, by standard, to have a unique key set ("DKS"), including 40 56-bit secret device keys, referred to as Device Private Keys, and a 40-bit identifier, referred to as the Key Selection Vector ("KSV"). During authentication, a transmitter ("Device A") sends to a receiver ("Device B") a message containing the transmitter's KSV ("Aksv") and a 64-bit pseudorandom value An. Device B responds with the receiver's KSV ("Bksv") and indicates whether Device B is a repeater. Device A verifies that Bksv has not been revoked and that it contains 20 ones and 20 zeros. Both devices then generate a session key ("Ks"), which is a 56-bit secret key for the HDCP cipher, a 64-bit secret value ("Mo") that is used for the next phase of authentication, and a 16-bit response value ("Ro") to indicate success of the authentication exchange.

If Device B is a repeater, the device gathers a list of downstream KSVs to report upstream. The KSVs are checked upstream to determine whether they have been revoked. The final step in authentication occurs during the vertical blanking period and involves both of the devices calculating new cipher initialization values Ki, Mi, and Ri, wherein the index i represents the frame number staring with 1 for the first video frame that is encrypted.

A general trend towards wireless links exists. However, as stated above, some transmission mechanisms, such as HDCP, cannot be provided over a wireless link. Therefore, a need exists to provide a wireless link between two nodes in which transmission mechanisms like HDCP would otherwise be provided.

SUMMARY

A system and method is provided for providing secure content between a source and destination over a wireless link. In one embodiment, the system includes a line-based receiver for receiving protected content from a source and a line-based transmitter for providing the protected content to a destination. The protected content is secure, such as by using a High-bandwidth Digital Content Protection (HDCP) mechanism.

Between the line-based transmitter and receiver is a wireless transmitter and a wireless receiver. The wireless transmitter establishes an encrypted wireless link with the wireless receiver according to a second encryption mechanism. An example of the encrypted wireless link is an Advanced Encryption Standard ("AES") data link. The wireless transmitter is further configured for receiving the protected content from the line-based receiver, encrypting the protected content according to the second encryption mechanism, and wirelessly transmitting the encrypted protected content. The wireless receiver is further configured for receiving the wirelessly transmitted protected content from the wireless transmitter and decrypting the protected content according to the second encryption mechanism.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

FIG. 1 illustrates a system for providing protectable content from a source to a destination.

FIG. 2 is a more detailed block diagram of the system of FIG. 1 in accordance with one embodiment.

DETAILED DESCRIPTION

Figure 3:
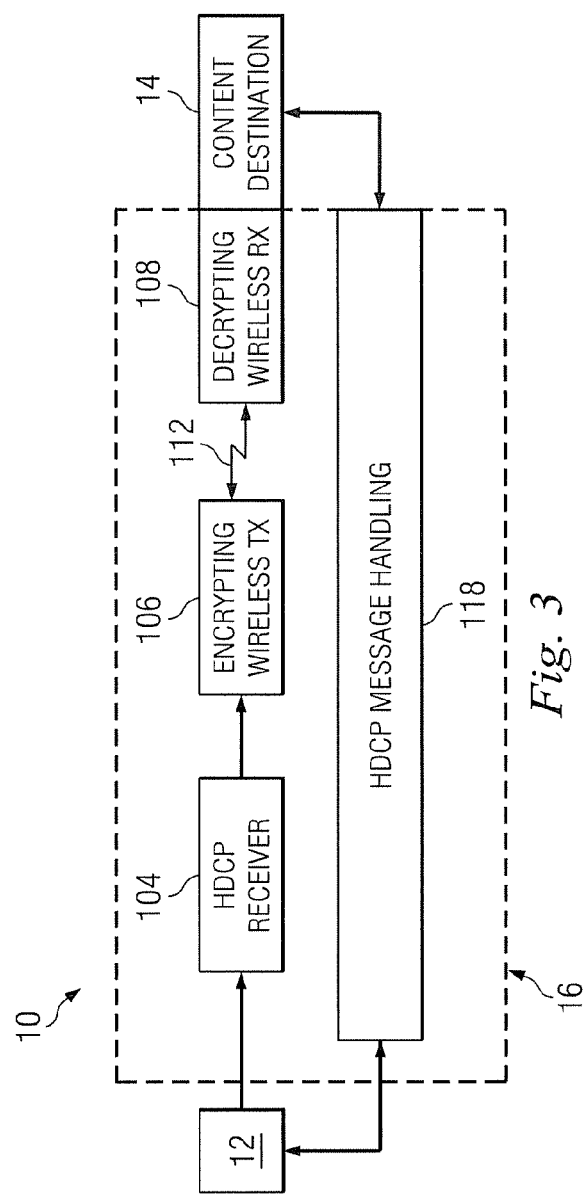
FIG. 3 is a more detailed block diagram of the system of FIG. 1 in accordance with an alternative embodiment.

The present invention relates generally to transmission and encryption systems. It is understood, however, that the following disclosure provides many different embodiments, or examples, for implementing different features of the invention. Specific examples of components and arrangements are described below to simplify the present disclosure. These are, of course, merely examples and are not intended to be limiting.

Referring to FIG. 1, a system 10 is an example of a communications network that can benefit from one or more embodiments of the present invention. The system 10 includes a source 12 of data and a destination 14 of the data. The system 10 provides a secure content delivery mechanism for protectable subject matter from the source 12 to the destination 14. The data is provided over a link 16, which is further described below.

One example of a source and destination is a compact disk (CD) player 12 providing a digital signal to an amplifier 14, with the protectable subject matter being copyright-protectable music. Another example of a source and destination is a satellite receiver 12 providing a digital signal to a television 14, with the protectable subject matter being copyright-protectable audio and video. Yet another example of a source and destination is a personal digital assistant 12 providing digital data to a monitor 14, with the protectable subject matter being a table of confidential data. Still another example of a source and destination is a computer 12 providing data to a docking station 14, with the protectable subject matter being a word-processing document. Yet another example of a source and destination is a cellular telephone 12 providing data to a network node 14, with the protectable subject matter being a confidential voice communication. The link 16 is illustrated as being bi-directional, but can have different characteristics, depending on the application.

For the sake of further example, the link 16 will be described as using, at least in part, an industry standard HDCP mechanism to perform content delivery and protection via upstream (towards the source) authentication. A second example would be a Digital Transmission Content Protection (DTCP) mechanism. Continuing with the HDCP mechanism example, the link 16 may include one or more HDMI or DVI physical cables and repeaters as is well known in the industry, and additional functionality, as discussed below.

Referring now to FIG. 2, in continuation of the above-mentioned HDCP example, in one embodiment, the link 16 includes a plurality of components, including an HDCP receiver 104, an encrypting wireless transmitter 106, a decrypting wireless receiver 108, and an HDCP transmitter 110. The HDCP receiver 104 and wireless transmitter 106 are connectable via an HDCP link, such as that described above. Similarly, the wireless receiver 108 and HDCP transmitter 110 are connectable via an HDCP link.

In accordance with one embodiment, the wireless transmitter 106 and wireless receiver 108 are connectable via a secure wireless link 112. In the present example, the wireless link 112 is a Certified Wireless USB Authenticated link. In an alternate embodiment, the wireless link 112 can be a WiMedia WXP Authenticated link, or other appropriate or future-developed link. The wireless link 112, in the present example, provides a full 128-bit Advanced Encryption Standard (AES) transfer mechanism for the data being transferred. The link 16 further includes an HDCP message handling mechanism 118. The HDCP message handling mechanism 118 is used to facilitate the necessary authentication with respect to the source 12 and the destination 14 in a manner such as that described above.

To the source 12 and destination 14, the link 16 functions as an HDCP repeater. It implements and adheres to all of the rules of an HDCP repeater, as specified in the aforementioned HDCP System Standard. This includes following compliance rules, such as the requirement that decrypted HDCP content, in a usable form flowing between two endpoints, be reasonably secure. As an HDCP repeater, the link 16 generates a session key (Ks) during the HDCP authentication process.

The embodiment illustrated in FIG. 2 provides a variety of protection components. For example, upstream authentication is performed using an industry standard HDCP mechanism. Similarly, authentication of all downstream devices is performed using an industry standard HDCP mechanism and in compliance with all rules applicable to an HDCP repeater. In one embodiment, the secure wireless link 112 is an AES link which may be implemented as follows. First, a Diffie-Hellman exchange may be used to establish a 2048-bit Diffie Hellman key. Next, a hash function may be used to produce a session key; for example, an AES Davies-Meyer hash function may be used to produce a 128-bit session key. HDCP procedures are used to authenticate the source side system. The session key produced by the hash function can thereby be used by the wireless link 112 to establish a secure communication channel. The wireless transmitter 106 will use the session key to encrypt data that is sent to the receiver 108. The receiver 108 will use the session key to decrypt the data.

In another embodiment, as shown in FIG. 3, the decrypting wireless receiver 108 is integrated with the destination 14 (e.g., a computer monitor, digital television, or amplifier), thereby eliminating the need for an HDCP transmitter, such as the HDCP transmitter 110 of FIG. 2. In the embodiment shown in FIG. 3, a variety of protection mechanisms are implemented. In particular, upstream authentication is performed using an industry standard HDCP mechanism. With regard to downstream authentication, it will be noted that in this embodiment, the destination device 14 must have full HDCP authentication capabilities, including keys, such that an industry standard HDCP mechanism may be used to authenticate the destination device. The link 16 is implemented as described above with reference to the embodiment illustrated in FIG. 1.

Figure 4:
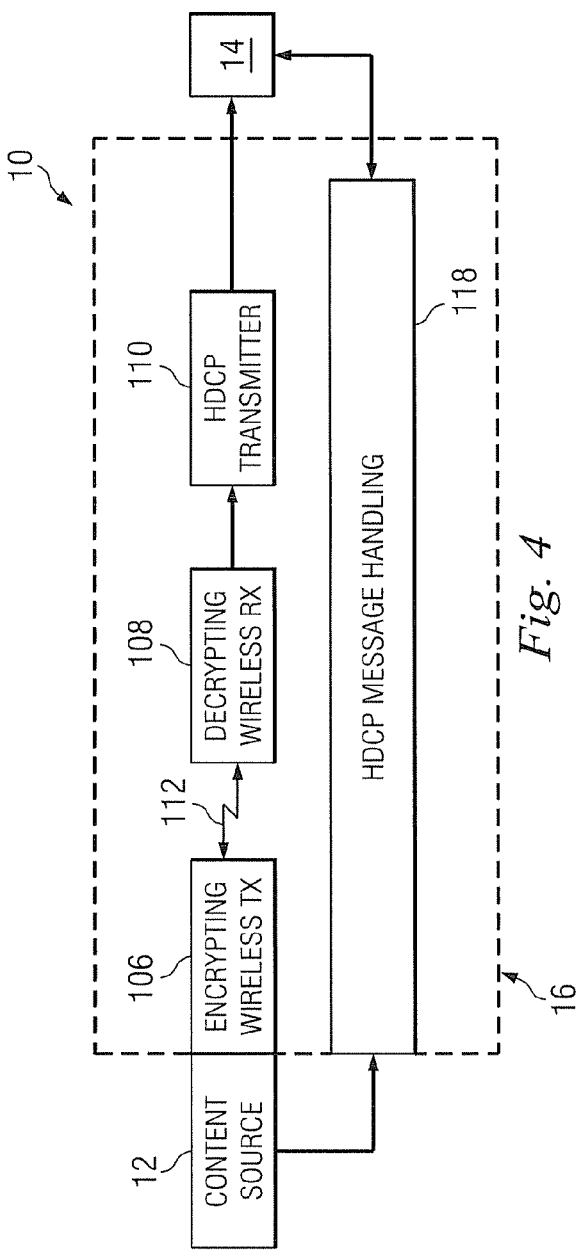
FIG. 4 is a more detailed block diagram of the system of FIG. 1 in accordance with another alternative embodiment.

In yet another embodiment, as shown in FIG. 4, the encrypting wireless transmitter 106 is integrated with the source 12 (e.g., a PDA, a satellite receiver, or a CD player), thereby eliminating the need for an HDCP receiver, such as the HDCP receiver 104 of FIG. 2. In the embodiment shown in FIG. 4, a variety of protection mechanisms are implemented. With regard to upstream authentication, it will be noted that in this embodiment, the source device 12 must have full HDCP authentication capabilities, including keys, such that an industry standard HDCP mechanism may be used to authenticate the device. Downstream authentication is performed using an industry standard HDCP mechanism. The link 16 is implemented as described above with reference to the embodiment illustrated in FIG. 1. Additionally, a seeded hardware functionality scan (HFS) may be performed to exercise the inner workings of the destination 14 using a portion of the Diffie Hellman key as a seed.

Figure 5:
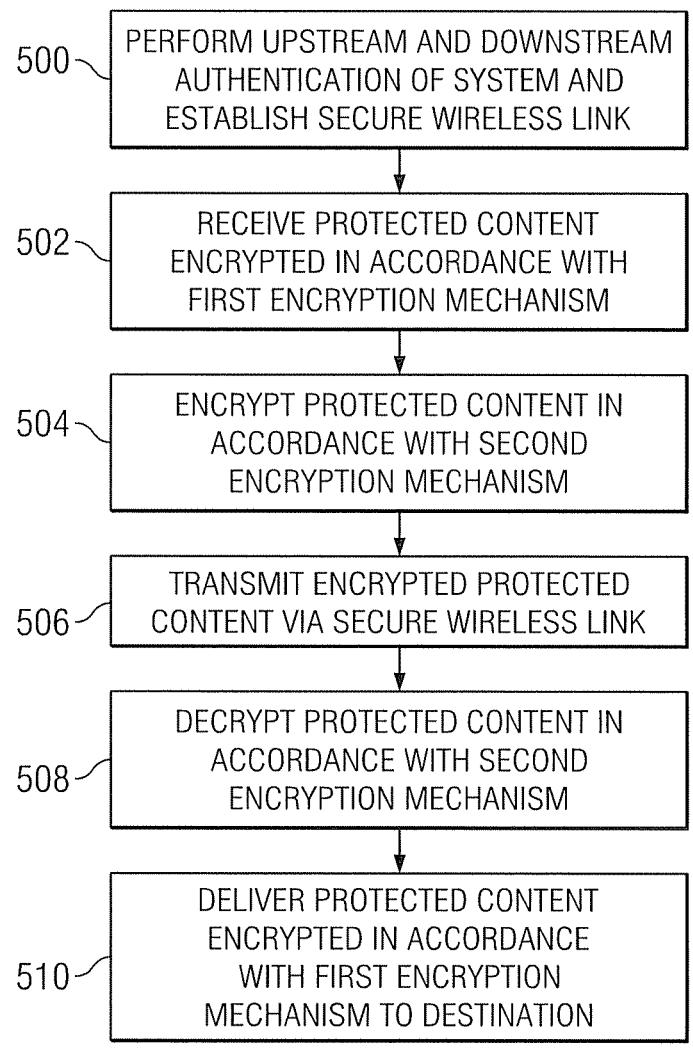
FIG. 5 is a flow chart illustrating operation of the embodiment illustrated in FIG. 2.

FIG. 5 is a flowchart illustrating operation of the embodiment shown in FIG. 2. In step 500, industry standard HDCP mechanisms are used to perform upstream and downstream authentication of the system 10 via the HDCP message handling mechanism 118. Additionally, the secure wireless link 112 is established, as described in detail above. In step 502, protected content encrypted in accordance with a first encryption mechanism, which in the embodiment illustrated in FIG. 2 is a standard HDCP encryption mechanism is transmitted to the receiver 104. In step 504, the encrypted protected content is transmitted to the encrypting wireless transmitter 106, where it is further encrypted in accordance with a second encryption mechanism, such as AES. In step 506, the encrypted protected content is transmitted via the wireless link 112 to the decrypting wireless receiver 108. In step 508, at the decrypting wireless receiver 108, decryption is performed in accordance with the second encryption mechanism. In step 510, the transmitter 110 receives the protected content, which is still encrypted in accordance with the first encryption mechanism, and delivers it to the destination 14.

It will be recognized that similar steps are performed by the embodiments illustrated in FIGS. 3 and 4. In particular, operation of the embodiment shown in FIG. 3 proceeds as illustrated in FIG. 5, except that because in the embodiment of FIG. 3 the transmitter 110 is omitted, in steps 508-510, the protected content encrypted in accordance with the first encryption mechanism is delivered to the destination 14 directly from the decrypting wireless receiver 108. Similarly, operation of the embodiment shown in FIG. 4 proceeds as illustrated in FIG. 5, except that because in the embodiment the receiver 104 is omitted, in steps 502-504, the protected content encrypted in accordance with the first encryption mechanism is transmitted directly from the source 12 to the encrypting wireless transmitter 106.

Each of the above-mentioned components can be implemented as computer software, electrical logic, or combinations thereof. Also, although components are shown separately in the figures, in some embodiments one or more of the components on either side of the wireless link 112 may be combined into a single integrated circuit device, or a group of devices.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A system comprising:
    a line-based receiver for receiving protected content from a source, the received protected content being encrypted according to a first encryption mechanism;
    a wireless transmitter for establishing a secure wireless link with a wireless receiver according to a second encryption mechanism, wherein the wireless transmitter is further configured for receiving the protected content from the line-based receiver, encrypting the protected content according to the second encryption mechanism, and wirelessly transmitting the encrypted protected content over the secure wireless link;
    the wireless receiver for establishing the secure wireless link with the wireless transmitter, the wireless receiver being further configured for receiving the wirelessly transmitted encrypted protected content from the wireless transmitter and decrypting the received encrypted protected content according to the second encryption mechanism to output the protected content; and
    a line-based transmitter for receiving the protected content from the wireless receiver and transmitting the protected content to a destination, the transmitted protected content being still encrypted according to the first encryption mechanism.

2. The system of claim 1, wherein one of the line-based receiver and the wireless transmitter is further configured to encrypt the protected content according to the first encryption mechanism, and wherein one of the wireless receiver and the line-based transmitter is further configured to decrypt the protected content according to the first encryption mechanism.

3. The system of claim 1 further comprising:
    a High-bandwidth Digital Content Protection (HDCP) message handling device for establishing a content-protected connection between the source and the destination;
    wherein the line-based receiver is an HDCP receiver coupled to said wireless transmitter by a HDCP link; and
    wherein the line-based receiver is further coupled to the source.

4. The system of claim 1 wherein at least one of the line-based receiver and the line-based transmitter uses line-based video transmission.

5. The system of claim 1, further comprising:
    a High-bandwidth Digital Content Protection (HDCP) message handling device for establishing a content-protected connection between the source and the destination;
    wherein the line-based receiver is a High-bandwidth Digital Content Protection ("HDCP") compliant receiver; and
    wherein said line-based receiver, said wireless transmitter, said wireless receiver, said line-based transmitter and said HDCP message handling device are configured to operate together as an HDCP repeater.

6. The system of claim 1 wherein the line-based transmitter is a High-bandwidth Digital Content Protection ("HDCP") compliant transmitter.

7. The system of claim 1 wherein the first encryption mechanism is an HDCP encryption mechanism.

8. The system of claim 1 wherein the second encryption mechanism is Advanced Encryption Standard ("AES").

9. A method for providing a secure content delivery mechanism for protectable subject matter (PSM), the method comprising:
    receiving, at a first receiver, the PSM encrypted according to a first encryption mechanism (PSM1) dictated by a source over a first wired link;
    converting the PSM1 to a PSM encrypted according to a second encryption mechanism (PSM2), wherein the second encryption mechanism is different from the first encryption mechanism;
    transmitting, using a wireless transmitter, the PSM2 via a secure wireless link;
    receiving, at a wireless receiver, the wirelessly transmitted PSM2;
    converting the received PSM2 back to the PSM1; and
    transmitting, using a transmitter, the converted PSM1 message to a destination over a second wired link.

10. The method of claim 9 wherein converting the PSM1 to PSM2 includes encrypting the PSM1 according to the second encryption mechanism.

11. The method of claim 9 further comprises:
    establishing the secure wireless link; and
    authenticating the secure wireless link.

12. The method of claim 11 wherein the step of establishing the secure wireless link comprises utilizing a session key.

13. The method of claim 12 wherein the converting the PSM1 to the PSM2 and the converting the received PSM2 back to the PSM1 comprises utilizing the session key.

14. The method of claim 9 wherein the first encryption mechanism is High-bandwidth Digital Content Protection (HDCP) and the second encryption mechanism is Advanced Encryption Standard (AES).

15. The method of claim 9 further comprising:
    performing message handling between the source and the destination to establish a secure content delivery mechanism therebetween.

16. The method of claim 9 wherein the first receiver is an HDCP receiver being integrated with the source.

17. The method of claim 16, wherein the transmitter is an HDCP transmitter being integrated with the destination.

18. A system comprising:
    means for receiving protected content from a source via a wired link, the received protected content being encrypted according to a first encryption mechanism;
    wireless transmitter means for wirelessly establishing a secure wireless link with a wireless receiver means according to a second encryption mechanism, for receiving the protected content from the means for receiving, for encrypting the protected content according to the second encryption mechanism, and for wirelessly transmitting the encrypted protected content over the secure wireless link;

the wireless receiver means for establishing the secure wireless link with the wireless transmitter means, for receiving the wirelessly transmitted protected content from the wireless transmitter means, and for decrypting the received encrypted protected content according to the second encryption mechanism to output the protected content; and transmitter means for receiving the protected content from the wireless receiver means and for transmitting the protected content via a wired link to a destination, the transmitted protected content being still encrypted according to the first encryption mechanism.

19. The system of claim 18, wherein one of the means for receiving protected content from the source via a wired link or the wireless transmitter means is configured to encrypt the protected content according to the first encryption mechanism, and wherein one of the wireless receiver means and the transmitter means is further configured to decrypt the protected content according to the first encryption mechanism.

20. The system of claim 18, further comprising:

means for handling High-bandwidth Digital Content Protection (HDCP) messages to establish a content-protected connection between the source and the destination;

wherein the means for receiving the protected content from the source is an HDCP receiver coupled to said wireless transmitter means by a HDCP link; and wherein the means for receiving the protected content is further coupled to the source.

21. The system of claim 1, wherein said source is a satellite receiver and said destination is a television.

22. The method of claim 9, wherein said source is a satellite receiver and said destination is a television.

* * * * *